US007073916B2

(12) United States Patent
Yin et al.

(10) Patent No.: US 7,073,916 B2
(45) Date of Patent: Jul. 11, 2006

(54) KEY FOR USE IN LOW LIGHT CONDITIONS

(75) Inventors: Memphis Zhihong Yin, Corvallis, OR (US); Dennis R Esterberg, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 159 days.

(21) Appl. No.: 10/134,874

(22) Filed: Apr. 29, 2002

(65) Prior Publication Data

US 2003/0202337 A1 Oct. 30, 2003

(51) Int. Cl.
*G01D 11/28* (2006.01)

(52) U.S. Cl. .......................................... 362/84; 362/23

(58) Field of Classification Search .................. 362/84, 362/23, 85; 345/168
See application file for complete search history.

(56) References Cited

U.S. PATENT DOCUMENTS 5,477,430 A * 12/1995 LaRose ....................... 362/84
5,669,694 A 9/1997 Morton, Sr.
5,793,358 A * 8/1998 Petkovic et al. ............ 345/168
5,815,225 A 9/1998 Nelson
5,818,361 A 10/1998 Acevedo
5,868,487 A 2/1999 Polley et al.
5,936,554 A 8/1999 Stanek
6,036,326 A * 3/2000 Yoshikawa et al. ........... 362/23
6,145,992 A 11/2000 Wattenburg
6,161,944 A 12/2000 Leman
6,179,432 B1 1/2001 Zhang et al.
6,281,812 B1 8/2001 Kim
6,331,083 B1 12/2001 Harris
6,416,196 B1 * 7/2002 Lemarchand et al. ......... 362/84
6,658,773 B1 * 12/2003 Rohne et al. ................. 40/542
2002/0000284 A1 1/2002 Nishi

FOREIGN PATENT DOCUMENTS

JP 63-192621 12/1988
JP 3010197 4/1995
JP 8-228217 9/1996
JP 8-329766 12/1996

OTHER PUBLICATIONS

Itronix GoBook MAX Brochure, Prior to Mar. 1, 2002.

* cited by examiner

*Primary Examiner*—Sandra O'Shea
*Assistant Examiner*—Anabel Ton

(57) ABSTRACT

A key, which may be used in a user interface, including indicia formed at least in part from phosphorescent material.

53 Claims, 6 Drawing Sheets

KEY FOR USE IN LOW LIGHT CONDITIONS

BACKGROUND OF THE INVENTIONS

1. Field of the Inventions

The present inventions are related to user interfaces such as, for example, keyboards.

2. Description of the Related Art

Many devices include user interfaces. Computers, which allow people to easily perform tasks such as word processing, spreadsheet calculations, database manipulation, e-mail message transmission, internet searches for information, and connecting to networks, are one example of a device that includes a user interface. The fact that computers have become such an integral portion of the average person's life has led to the development of portable computers, such as laptop and notebook computers. Portable computers have proven to be a significant advance because they are relatively small (e.g. about 13 inches wide, 10.5 inches long and 1.5 inches high) and lightweight (i.e. about 5 lbs.). More recently, a variety of hand-held (or palm sized) portable computers have been introduced. As a result, people are able to easily transport portable computers to remote locations where they can perform the same tasks that they could with their relatively immobile desktop computers. Notebooks and other portable computers often include a display and keyboard, as well as click buttons, scroll keys and touch pads that together perform the functions of a mouse.

Portable computers and other devices that include user interfaces may, of course, be operated in a wide variety of environments. The inventors have determined that some of the environments in which user interfaces are used, such as airplanes, dimly lit rooms and outdoor areas at night, fail to provide adequate ambient lighting, which makes it difficult for the user to see the user interface (a keyboard in the case of a computer) and work efficiently. As such, the inventors have determined that it would be beneficial to provide user interfaces for use in computers (and other devices) that do not rely on ambient light for visibility.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

Figure 1:
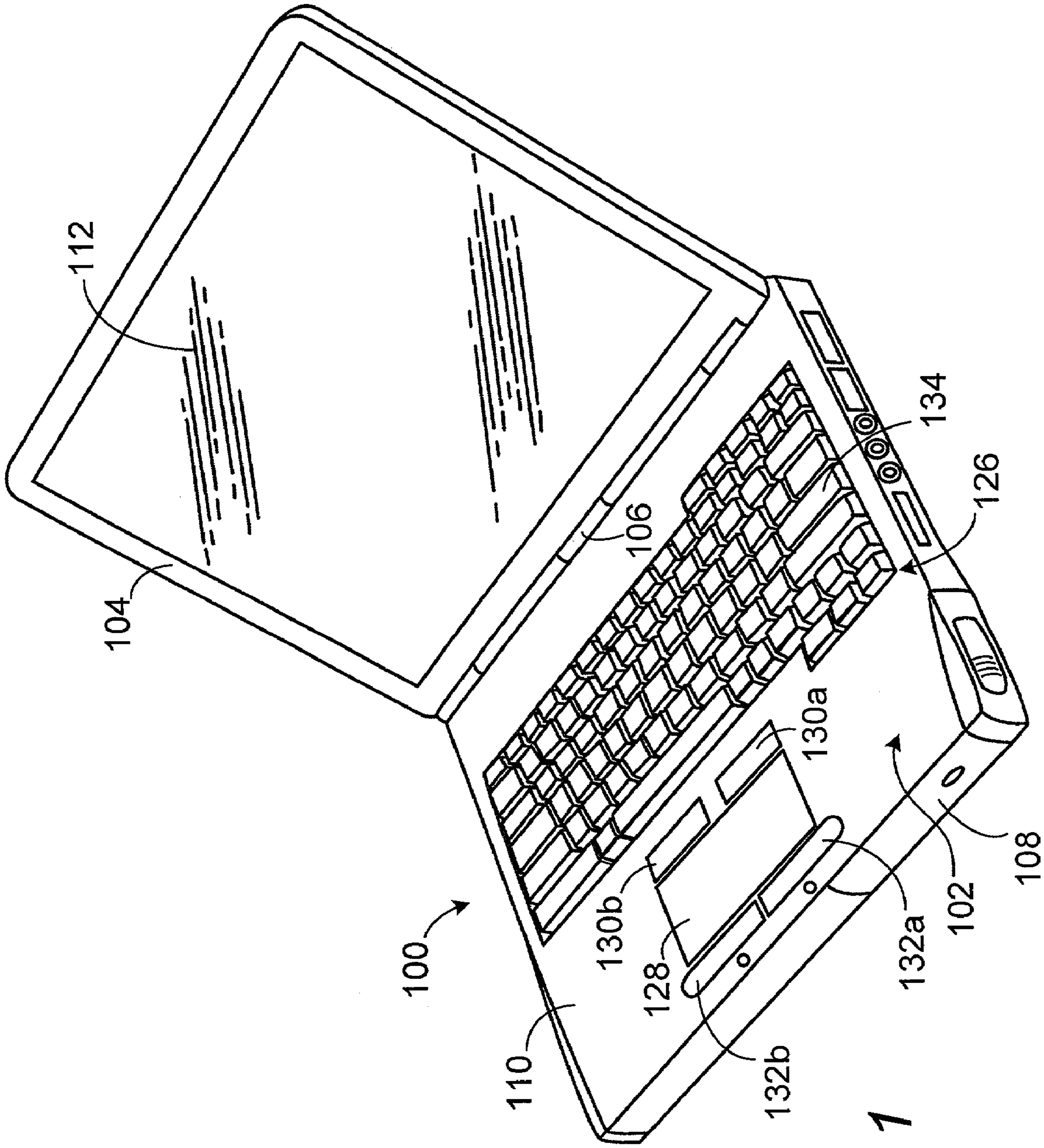
FIG. 1 is a perspective view of a portable computer in accordance with a preferred embodiment of a present invention.

The following is a detailed description of the best presently known modes of carrying out the inventions. This description is not to be taken in a limiting sense, but is made merely for the purpose of illustrating the general principles of the inventions. The present inventions are described below in the context of a portable computer. Nevertheless, the present inventions are not limited to computers or use therewith. Rather, the present inventions are applicable to any device which includes a user interface that may be operated in low ambient light conditions. Additionally, detailed discussions of various conventional internal operating components of computers and keyboards which are not pertinent to the present inventions have been omitted for the sake of simplicity Although not limited to any particular type of device that includes a user interface, one embodiment of a present invention is the exemplary notebook style portable computer 100 illustrated in FIGS. 1 and 2. The exemplary portable computer 100 is, with respect to many of the structural and operating components, substantially similar to conventional portable computers such as the Hewlett-Packard Omnibook 6000 notebook PC. More specifically, the exemplary portable computer 100 includes structural components such as a main housing 102 and a display housing 104 that is pivotably connected to the main housing by a hinge 106. The main housing 102 includes a module bay for optional modules such as the illustrated CD-ROM drive module 108, a 3.5 inch disk drive module, or a ZIP drive module, and a battery bay (not shown). The exemplary main housing 102 is also provided with a user interface 110 that allows the user to interact with the computer 100. The user interface 110 is discussed in greater detail below. In addition to supporting a display 112, the display housing 104 also acts as a lid to cover the user interface 110 when in the closed position. To that end, a conventional latch arrangement (not shown) may be provided to lock the free end of the display housing 104 to the main housing 102 and maintain the display housing in the closed position.

Figure 2:
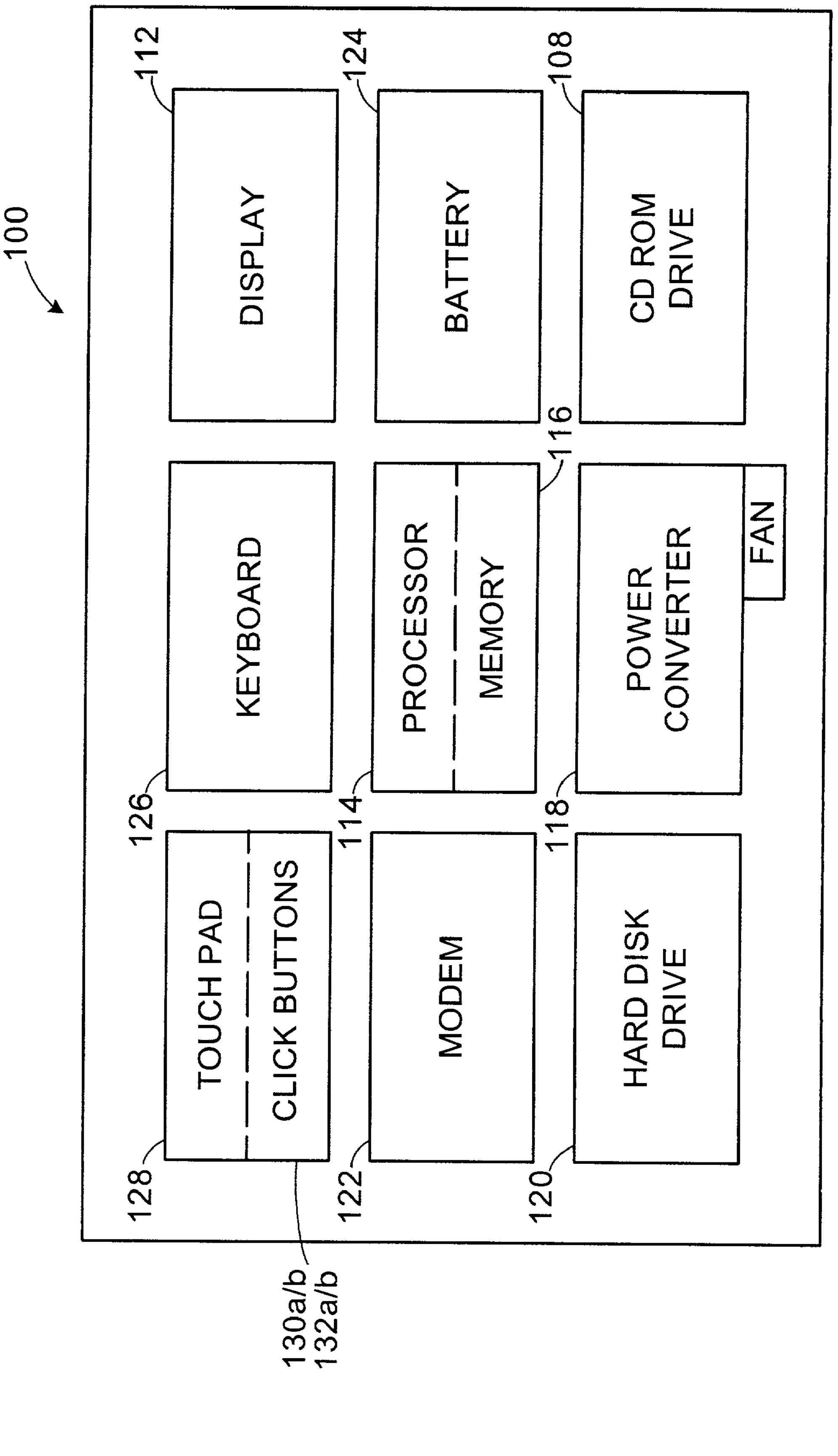
FIG. 2 is a block diagram showing various operating components of a portable computer in accordance with a preferred embodiment of a present invention.

As illustrated in block diagram form in FIG. 2, the operating components of the exemplary computer 100 include a CPU (or "processor") 114, cache and RAM memory 116, a power adapter and fan arrangement 118, a hard disk drive 120, a modem 122, and a battery 124 positioned within the battery bay. The exemplary portable computer 100 may also include other conventional components such as, for example, audio and video cards, headphone and microphone ports, serial, parallel and USB ports, keyboard and mouse ports, a 240-pin PCI connector for docking, an operating system such as Microsoft® Windows, and various application programs such a word processing, spreadsheets, security programs and games.

The user interface 110 in the exemplary computer 100 illustrated in FIGS. 1 and 2 includes a keyboard 126, a touch pad 128, a first pair of right/left click buttons 130*a*/130*b* and a second pair of right/left click buttons 132*a*/132*b*. Each of these elements operates in conventional fashion to control the operations of the computer 100 and application programs running thereon. The exemplary keyboard 126 includes a plurality of keys 134, each having indicia 136 (FIG. 4) that corresponds to the purpose or function of the key.

In the exemplary embodiment, the keys 134 consist of alphanumeric keys for each letter of the alphabet and the numerals 0–9, specialized keys such as "enter," "tab" and "backspace" keys, a space bar, function keys, and cursor control keys as well as indicia 136 indicative of theses purposes or functions. Other keys, such as "ctrl" keys and "alt" keys, may also be provided. Exemplary key layouts include the QWERTY layout and the DVORAK layout. It should be noted, however, that the inventions herein are not limited to any particular key layout and keys may be added, removed or rearranged as desired in order to suit particular applications. Additionally, although the indicia 136 on the exemplary keys corresponds to the English language, the indicia may, of course, correspond to the letters and symbols associated with other languages.

The keys 134 in the exemplary implementation may be carried by respective actuators that are mounted on a keyboard base pan. The actuators cooperate with signal generation circuitry (such as flexible membrane circuit positioned a small distance from a relatively immovable circuit) that transmits an appropriate signal when a key is depressed. The keys 134 in the exemplary keyboard 126, which are preferably formed from a relatively hard material such as plastic, are separate structural elements. An aperture 135 (FIG. 5) is provided for mounting the keys on the actuators. The present inventions are not, however, limited to any particular key configuration or keyboard configuration. For example, the present inventions are applicable to keyboards which consist of a single flexible membrane that has indicia formed thereon to provide a visual representation of a keyboard layout, such as the keyboard layout illustrated in FIG. 1, and a plurality of signal generators respectively located under the indicia representing individual keys. Keys in accordance with the present inventions do not even have to be depressible. Rather, the term "key" is used herein to represent any device or portion thereof which is touched by a user to achieve a particular result (such as generating a signal which indicates that the key has been touched).

Figure 4:
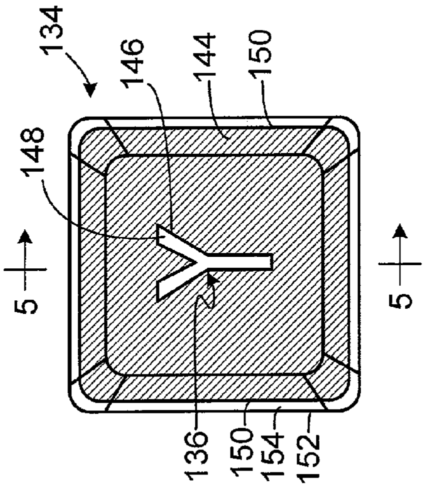
FIG. 4 is a plan view showing a key in accordance with a preferred embodiment of a present invention.
Figure 6:
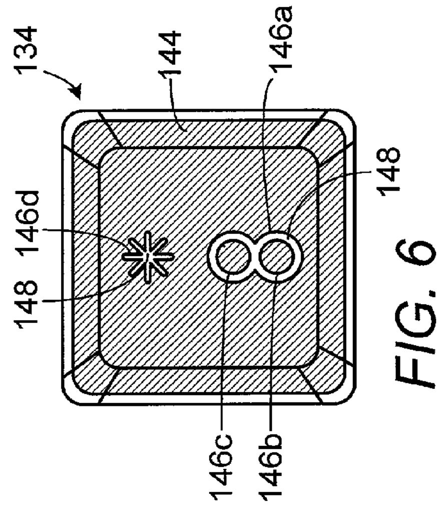
FIG. 6 is a plan view showing a key in accordance with a preferred embodiment of a present invention.
Figure 3:
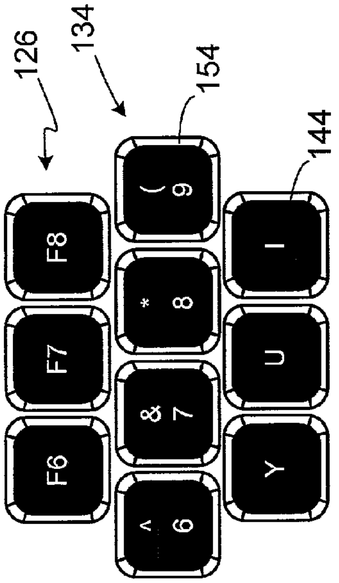
FIG. 3 a plan view showing a portion of a keyboard in accordance with a preferred embodiment of a present invention.
Figure 5:
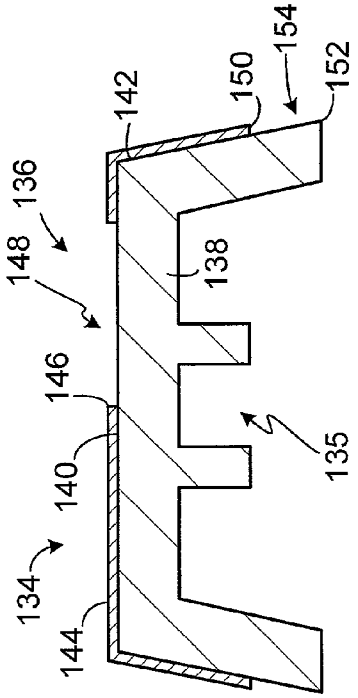
FIG. 5 is a section view taken along line 5—5 in FIG. 4.

Referring to FIGS. 3–5, one exemplary implementation of a key 134 includes a key body 138 having a top surface 140 and four side surfaces 142. The top surface 140 may be flat (as shown), concave, or convex. The key body 138 is formed from phosphorescent material, i.e. material that absorbs light energy when it is irradiated by a light source, stores the light energy, emits light from the visible portion of the electromagnetic spectrum ("visible light"), and continues to emit visible light (until the stored energy has been depleted) when it is no longer being irradiated by light from the light source. Such material is sometimes referred to a "glow in the dark" material. The exemplary key 134 also includes an opaque layer 144 that has an inner boundary surface 146. The inner boundary surface 146 defines an open region 148 (i.e. a region with no opaque material) in the shape of the indicia 136. Depending on the particular indicia 136 that is being formed, the opaque layer 144 may include a number of inner boundary surfaces 146 that together define one or more characters or other forms of indicia. As illustrated in FIG. 6, for example, the opaque layer 144 includes inner boundary surfaces 146*a*, 146*b*, 146*c* and 146*d* that define open regions 148 in the shape of an "8" and a "*." Although there may be a plurality of inner boundary surfaces 146 and open regions 148 in a particular key, the inner boundary surfaces and open regions are frequently referred to below in the singular for purposes of simplicity.

Figure 7:
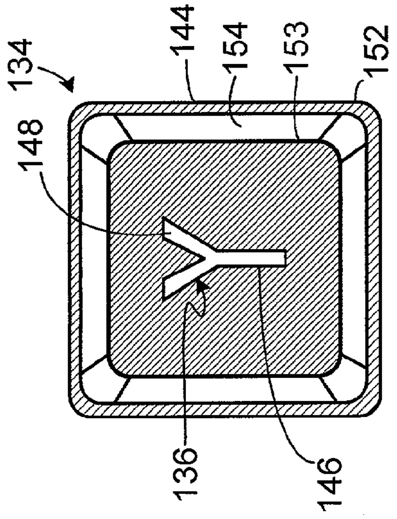
FIG. 7 is a plan view showing a key in accordance with a preferred embodiment of a present invention.
Figure 8:
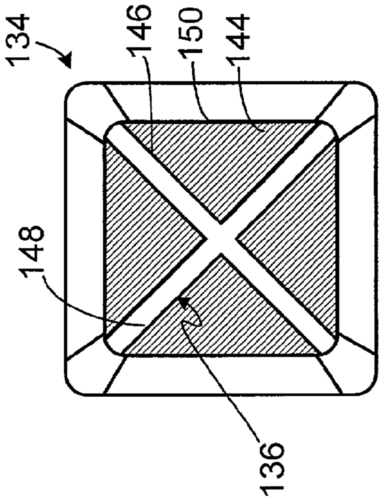
FIG. 8 is a plan view showing a key in accordance with a preferred embodiment of a present invention.

The size of the opaque layer 144 relative to the key body 138 may vary in order to suit particular needs. Preferably, but not necessarily, the opaque layer 144 covers at least the entire top surface 140 of the key body 138. The exemplary opaque layer 144 illustrated in FIGS. 3–5 also covers a portion of the side surfaces 142. More specifically, the perimeter 150 (or "outer boundary surface") of the opaque layer 144 is located approximately 0.05 inch from the side surface bottom edges 152. This results in an open region 154 that extends around the bottom portion of the side surfaces 142. The opaque layer 144 could also, for example, completely cover each of side surfaces 142, cover none of the side surfaces, cover some or all of one or more side surfaces (but not others), and/or cover the top and bottom portions of the side surfaces with an open region therebetween. Referring to FIG. 7, the open region 154 can also extend partially down each side surface 142 from the top edge 153, thereby creating an open region between two opaque areas. It should also be noted that, as illustrated for example in FIG. 8, the inner boundary surface 146 can extend all the way to the perimeter 150 of the opaque layer 144.

Figure 9A:
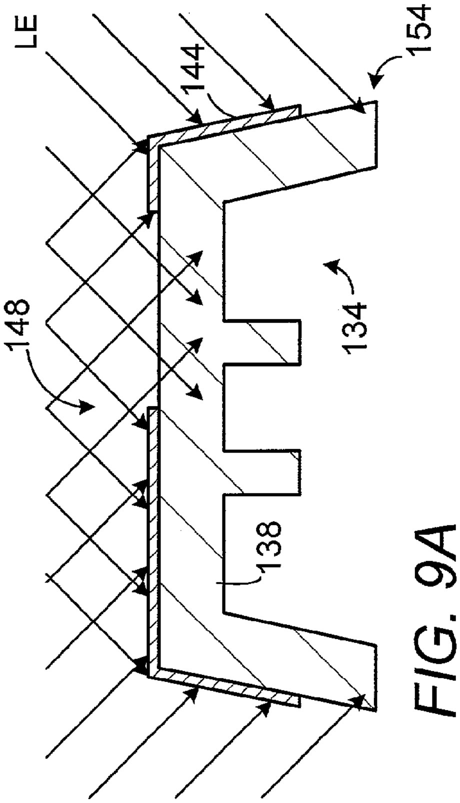
FIGS. 9A and 9B are section views respectively showing light being absorbed by, and emitted from, a key in accordance with a preferred embodiment of a present invention.
Figure 9B:
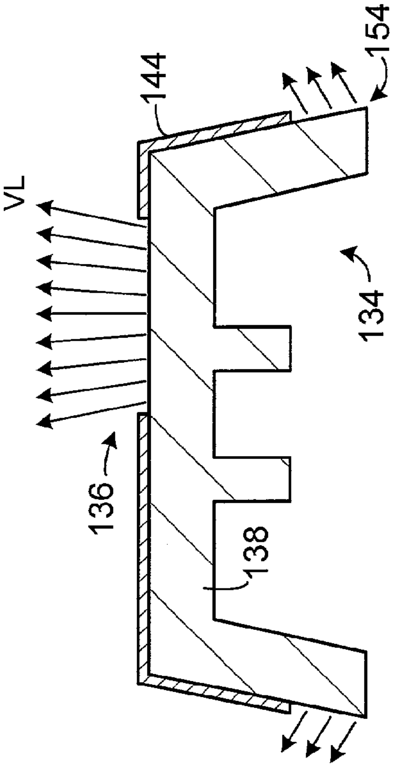

The open region 148 in the exemplary implementation exposes a portion of the key body top surface 140 in the shape of the indicia 136. As illustrated for example in FIG. 9A, the phosphorescent material that forms the key body 138 can absorb (and store) light energy LE which passes through the open region 148. The open region 148 also allows visible light VL to be emitted by the key body 138 in the manner illustrated in FIG. 9B. In accordance with the present inventions, the light is emitted from an area in the shape of the indicia 136. Light energy LE is also absorbed by the phosphorescent key body 138 though the open region 154 in those instances where the side surfaces 142 are not completely covered by the opaque layer 144. The addition of the open region 154 therefore allows the phosphorescent material to be more rapidly charged than would be the case if a key only included the open region 148 for the indicia 136. The visible light VL emitted through the open region 154 defines a border around each of the keys 134 that allows the user to readily distinguish where one key ends and the adjacent keys begin. (As in FIG. 3.)

Accordingly, even when the keys 134 are used in a dark or dimly lit area, the indicia 136 is visible because the keys emits visible light (or "glow in the dark") from a region in the shape of the indicia so long as the phosphorescent material was previously exposed to light energy. The borders of each key, as defined by the open regions 154, is also made visible by emitted light. The light emission continues until the energy stored in the phosphorescent material has been depleted. There are a variety of advantages associated with such an arrangement. Most notably, the exemplary computer 100 (or other device which includes the keys) may be used in low visible light conditions where operation of the user interface would otherwise be difficult because the user is able to identify the individual keys and the indicia respectively associated therewith.

Light energy can be provided to the exemplary keys 134 in a variety of ways. For example, the phosphorescent material absorbs light energy when the portable computer 100 (or other device which includes the keys) is used, or merely positioned, in an area with adequate ambient light.

Alternatively, in those instances where the keys 134 are incorporated into a device that has a display, the display can be used to provide light energy to the keys. In the case of the portable computer 100, for example, the display housing 104 can be pivoted to its closed position where the display 112 faces, and is in close proximity to, the keys 134. The portable computer 100 may be provided with a hardware and/or software based setting that causes the display 112 to display a solid white image by, for example, simply activating the display backlight if the display is a backlit display. It has been found that the exemplary keys 134, when formed using the phosphorescent material described below, emits visible light (i.e. glow) for approximately 10 hours after being charged in this manner for 20 minutes.

Figure 10A:
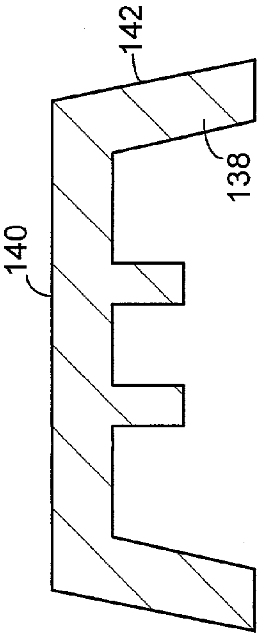
FIGS. 10A, 10B and 10C are section views showing a method of forming a key in accordance with a preferred embodiment of a present invention.
Figure 10B:
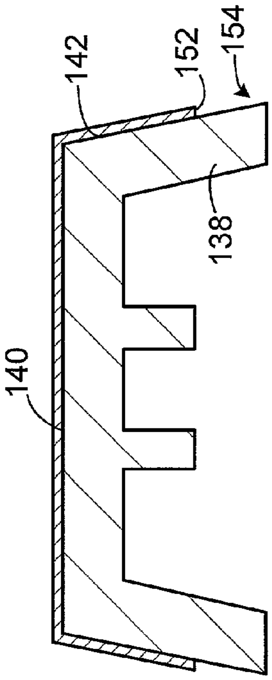
Figure 10C:
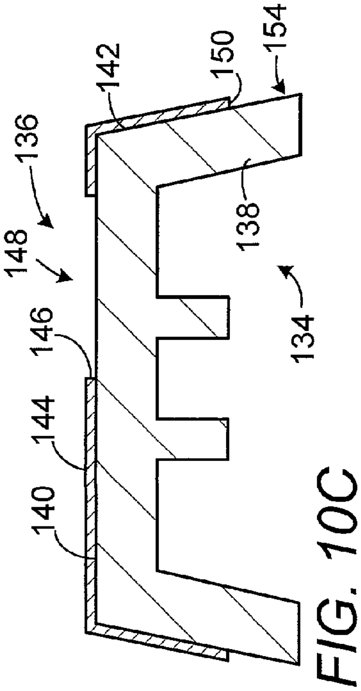

The exemplary keys 134 may be formed in a variety of ways. One exemplary method of forming the keys 134 is illustrated in FIGS. 10A–10C. The initial step here is the formation of the phosphorescent key body 138. [FIG. 10A.] Although molding is the preferred method of forming the key body 138, other methods, such as machining, may also be employed. Suitable materials for the phosphorescent key body 138 include phosphorescent plastics such as Lexan® Intrigue™, manufactured by GE Plastics. Next, as illustrated in FIG. 10B, the opaque layer 144 is formed on the desired portion of the phosphorescent key body 138. The entire top surface 140, and equal portions of each of the side surfaces 142, are covered with the opaque layer 144 in the illustrated embodiment. The outer boundary 150 of the opaque layer and open region 154 may be formed by only covering the portions of the side surfaces 142 with the opaque layer 144 that is ultimately covered. Alternatively, the entire side surface 142 could be covered by the opaque layer 144 with portions of the opaque layer removed thereafter in the manner described below with reference to FIG. 10C. Preferably, the opaque layer 144 is formed from opaque paint that is deposited by a process such as screen printing, spray overcoating, dipping and inkjet printing. Suitable paints include opaque acrylic lacquers. Inks and suitable plastics may also be used. The opaque layer 144 (which is disproportionately large in the Figures) need only be thick enough to insure that the layer is opaque and resilient enough for use. Typically, the thickness is about 0.002 inch. Turning to FIG. 10C, portions of the opaque layer 144 on the top surface 140 may be removed to form the open region 148 (and indicia 136). Suitable methods of removing portions of the opaque layer 144 include laser etching, chemical etching and mechanical etching.

The opaque layer 144 may also be formed using a masking process (not shown). Here, a mask material (such as wax) in the shape of the open region 148 is deposited onto the top surface 140 prior to the opaque layer 144. After the opaque layer 144 has been formed over the top surface 140 and the mask material, the mask material is dissolved in a bath, thereby removing the mask material and the portions of the opaque layer 144 that were covering the mask material.

Another exemplary method of forming the keys 134 involves forming the phosphorescent key body in the manner described above with reference to FIG. 10A. Next, instead of forming a solid opaque layer and thereafter removing portions of the opaque layer in the manner described above with reference to FIGS. 10B and 10C, the opaque layer is simply be formed over the key body top and side surfaces with the open regions already in place. This may be accomplished by silk-screening or other suitable processes.

Regardless of the method of manufacture and materials used, the phosphorescent and opaque materials should be selected such that the indicia 136 is readily visible, both under normal ambient light conditions and low light conditions where the user must rely on the glowing of the phosphorescent material to see the indicia. For example, the opaque layer 144 may be formed from material that is relatively dark (e.g. black or dark gray) and the key body 138 formed from phosphorescent material that appears relatively light (e.g. light blue or white) under normal ambient light conditions and which emits light in a color that is easily visible (e.g. white, light blue or green) against the relatively dark opaque material. Alternatively, the opaque layer 144 may be formed from a material that is relatively light (e.g. white or light grey) and the key body 138 formed from phosphorescent material that appears relatively dark (e.g. medium red, medium green or medium blue) under normal ambient light conditions and which emits light in a color that is easily visible against the relatively light opaque material (e.g. red, green or blue). The colors of the phosphorescent and opaque materials could be the same or very close under normal ambient light in order to provide a key whose indicia is only visible while it is glowing.

Additionally, although each of the keys 134 in a user interface (such as the exemplary keyboard 126) can be configured such that they have the same phosphorescent/opaque material color combination, the colors of the phosphorescent and/or opaque materials may be varied from key to key. Each key 134 in a user interface could, for example, have an opaque layer 144 that is the same color and key bodies 138 formed from phosphorescent materials that glow in different colors. Here, all of the keys 134 with indicia 136 corresponding to the letters A–Z and the numbers 0–9 could, for example, emit white light, while the remaining keys emit blue light. Similarly, the color of the opaque layers 144 may vary from key to key, while the color of the emitted light is the same for each key or also varied from key to key. Other considerations may also be taken into account when selecting the color of the opaque layer 144. It may, for example, be desirable for the color of opaque layer 144 to match the color of the remainder of the device. In the case of the exemplary the computer 100, the main housing 102 and opaque layer 144 could be the same color. The display housing 104 could also be the same color as the opaque layer 144 and the main housing 102.

Figure 11A:
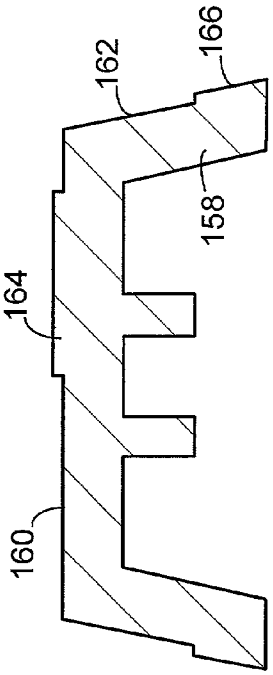
FIGS. 11A and 11B are section views showing a method of forming a key in accordance with a preferred embodiment of a present invention.
Figure 11B:
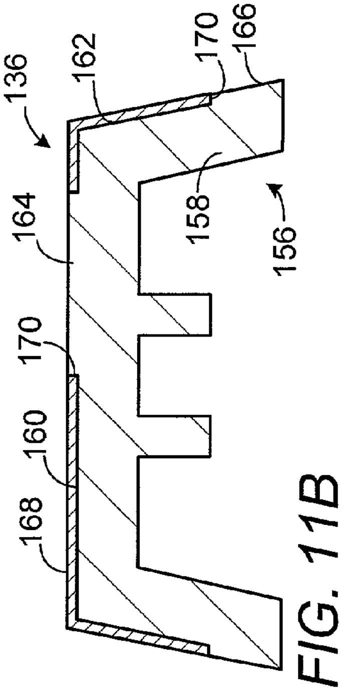

Another exemplary key in accordance with the present inventions is generally represented by reference numeral 156 in FIGS. 11A and 11B. The exemplary key 156 includes a phosphorescent key body 158, having a top surface 160 and side surfaces 162, that is formed in the manner described above. Here, however, the phosphorescent key body 158 also includes a raised portion 164 and, optionally, a raised portion 166. The raised portion 164 is in the shape of the indicia 136, while the raised portion 166 extends around the bottom portion of the side surfaces 162. An opaque layer 168 covers the portions of the key body top and side surfaces 160 and 162 that are not occupied by the raised portions 164 and 166. As such, the opaque layer 168 includes an inner boundary surface 170, which defines an open region in the shape of the indicia 136, and an outer boundary surface 172 that defines an open region at the bottom of the side surfaces 162. Here too, the phosphorescent material absorbs and emits light energy through the open regions that are not covered by the opaque layer 168.

The exemplary key 156 may be manufactured in a variety of ways. Preferably, a two-step injection molding process is used to form the exemplary key 156. First, as illustrated in FIG. 11A, the key body 158 is injection molded from a phosphorescent plastic material. The mold is then reconfigured and an opaque plastic material is injected into the mold to form the opaque layer 168. [FIG. 11B.] Alternatively, the opaque layer 168 could be formed first. It should be noted that, depending on the overall size of the key, the opaque layer 168 may be thicker than is shown in FIG. 11B relative to the key body 158.

Figure 12:
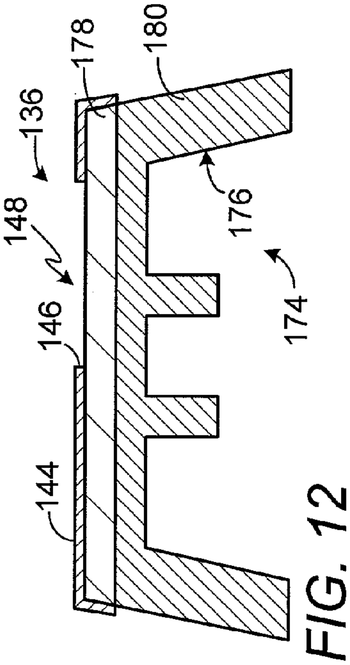
FIG. 12 is a section view of a key in accordance with a preferred embodiment of a present invention.

Another exemplary key in accordance with the present invention is generally represented by reference numeral 174 in FIG. 12. Here, the key body 176 is formed from a phosphorescent portion 178 and a non-phosphorescent portion 180, which may be formed from an opaque plastic or any other suitable material. The phosphorescent portion 178 of the exemplary key 174 is covered by an opaque layer 144 having an open region 148, in the shape of an indicia 136, with an inner boundary surface 146 in the manner describe above.

Figure 13B:
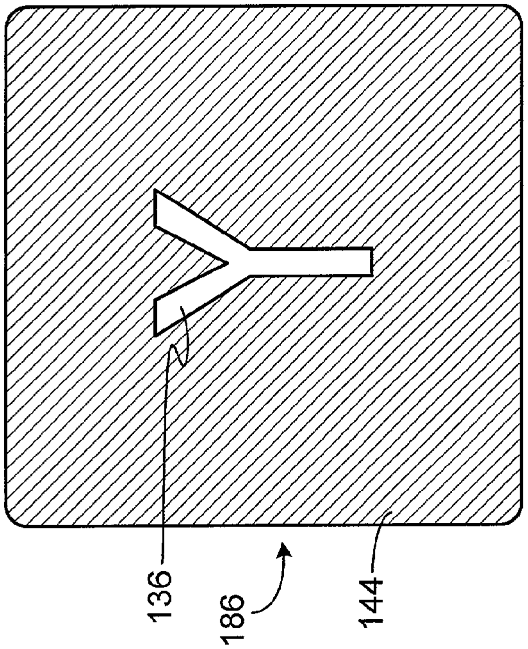
FIGS. 13A, 13B and 13C are plan and section views showing a method of forming a key in accordance with a preferred embodiment of a present invention.
Figure 13A:
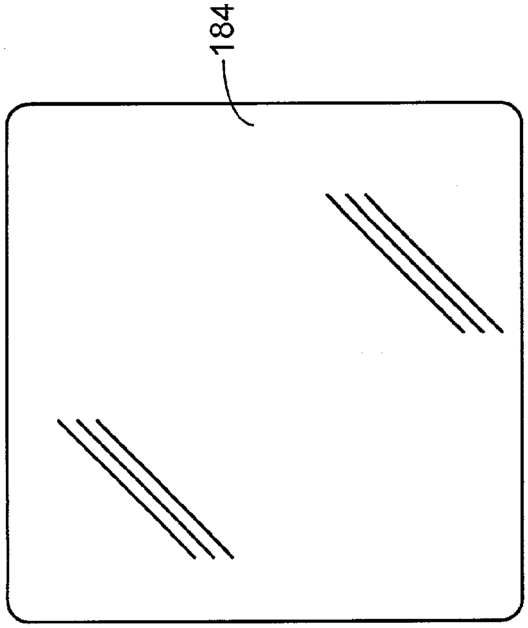
Figure 13C:
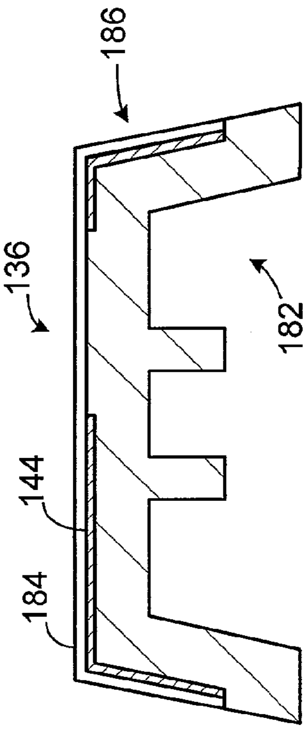

Yet another exemplary key in accordance with the present invention is generally represented by reference numeral 182 in FIG. 13C and may be manufactured in the manner illustrated in FIGS. 13A–13C. The process begins with a piece of transparent (or at least substantially transparent) material 184. The transparent material 184 may be pre-cut to size, as is shown in FIG. 13A, or cut to size later in the process. One suitable transparent material is Mylar. The opaque layer 144 is then printed onto the transparent material 184 to form a printed insert 186. [FIG. 13B.] The insert 186 is placed into a mold and phosphorescent material is injected into the mold to form the key body 138 and complete the key 182. [FIG. 13C.] This type of molding process is sometimes referred to as an "in-mold graphics" process.

Although the present inventions have been described in terms of the preferred embodiments above, numerous modifications and/or additions to the above-described preferred embodiments would be readily apparent to one skilled in the art. By way of example, but not limitation, the present inventions have application in user interfaces other than those used in portable computers. Such applications include desktop computers, electronic devices that are intended to be used in low light or outdoor areas, automatic teller machines, printers, scanners and cameras. Another application is a device that shines light from the inside of the device through translucent keys that have indicia printed thereon. Examples of such devices include certain portable telephones which shine light through the keys for a predetermined period (e.g. 30 seconds) when the phone is turned on and/or switch from the "sleep" to the "active" mode. Keys in accordance with the present inventions could be incorporated into such a phone. Such keys would continue to glow after the light within the phone turns off, thereby providing keys which are visible in low light conditions for longer periods without additionally taxing the phone's power supply. Such keys would, of course, also be charged by ambient light when exposed thereto. It is intended that the scope of the present inventions extend to all such modifications and/or additions.

We claim:

1. A device, comprising:

a housing; and a user interface, associated with the housing, including a plurality of keys, at least one of the keys defining an overall key volume and including a volume of phosphorescent key body material, which defines a surface, and a volume of substantially opaque material, associated with the surface of the phosphorescent key body material, having at least one inner boundary surface that defines an open region in the shape of a predetermined character, the volume of the substantially opaque material being substantially less than the volume of the phosphorescent key body material.

2. A device as claimed in claim 1, further comprising:

a display associated with the housing.

3. A device as claimed in claim 2, wherein the housing includes a user interface portion that supports the user interface and a display portion that supports the display.

4. A device as claimed in claim 3, wherein the user interface portion is pivotably secured to the display portion.

5. A device as claimed in claim 1, wherein the at least one inner boundary surface of the substantially opaque material comprises a plurality of inner boundary surfaces.

6. A device as claimed in claim 1, wherein the at least one key comprises a plurality of keys.

7. A device as claimed in claim 1, wherein the substantially opaque portion is covered by a layer of at least substantially transparent material.

8. A device as claimed in claim 1, further comprising:

an actuatable device located under the at least one of the keys;

wherein the phosphorescent key body material includes structure configured to engage the actuatable device.

9. A device, comprising:

a housing; and a user interface, associated with the housing, including a plurality of keys, at least one of the keys including a phosphorescent key body, defining a top exterior surface and a plurality of side exterior surfaces extending downwardly from the top exterior surface, and a substantially opaque portion at least partially covering each of the side exterior surfaces of the phosphorescent key body, covering less than all of at least one of the side exterior surfaces of the phosphorescent key body, and having at least one inner boundary surface on the top exterior surface that defines an open region in the shape of a predetermined character.

10. A device as claimed in claim 8, wherein the substantially opaque portion covers the entire top exterior surface of the phosphorescent key body except for the open region defining the predetermined character.

11. A device as claimed in claim 9, wherein the substantially opaque portion covers less than all of each of the side exterior surfaces of the phosphorescent key body.

12. A device as claimed in claim 9, wherein the phosphorescent key body defines a bottom exterior surface extending inwardly from the side exterior surfaces.

13. A user interface, comprising:

a plurality of keys;

at least one of the keys defining an overall key volume and including a volume of phosphorescent key body material, which defines a surface, and a volume of substantially opaque material, associated with the surface of the phosphorescent key body material, having at least one inner boundary surface that defines an open region in the shape of a predetermined character, the volume of the substantially opaque material being substantially less than the volume of the phosphorescent key body material.

14. A user interface as claimed in claim 13, wherein the at least one inner boundary surface of the substantially opaque material comprises a plurality of inner boundary surfaces.

15. A user interface as claimed in claim 13, wherein the at least one key comprises a plurality of keys.

16. A user interface as claimed in claim 13, wherein the substantially opaque portion is covered by a layer of at least substantially transparent material.

17. A user interface as claimed in claim 13, further comprising:

an actuatable device located under the at least one of the keys;

wherein the phosphorescent key body material includes structure configured to engage the actuatable device.

18. A user interface, comprising:

a plurality of keys;

at least one of the keys including a phosphorescent key body, defining a top exterior surface and a plurality of side exterior surfaces extending downwardly from the top exterior surface, and a substantially opaque portion at least partially covering each of the side exterior surfaces of the phosphorescent key body, covering less than all of at least one of the side exterior surfaces of the phosphorescent key body, and having at least one inner boundary surface on the top exterior surface that defines an open region in the shape of a predetermined character.

19. A user interface as claimed in claim 18, wherein the substantially opaque portion covers the entire top exterior surface of the phosphorescent key body except for the open region defining the predetermined character.

20. A user interface as claimed in claim 18, wherein the substantially opaque portion covers less than all of each of the side exterior surfaces of the phosphorescent key body.

21. A user interface as claimed in claim 18, wherein the phosphorescent key body defines a bottom exterior surface extending inwardly from the side exterior surfaces.

22. A key for use with a user interface, comprising:

a phosphorescent key body defining a surface;

a substantially opaque portion, associated with the surface of the phosphorescent key body, having at least one inner boundary surface that defines an open region in the shape of a predetermined character; and a layer of at least substantially transparent material that covers the substantially opaque portion;

wherein the key defines an overall key volume and the phosphorescent key body occupies a substantial portion of the overall key volume.

23. A key as claimed in claim 22, wherein the at least one inner boundary surface of the substantially opaque portion comprises a plurality of inner boundary surfaces.

24. A key as claimed in claim 22, wherein the phosphorescent key body includes a bottom side and a structure on the bottom side configured to engage an actuatable device.

25. A key for use with a user interface, comprising:

a phosphorescent key body defining a top exterior surface and a plurality of side exterior surfaces extending downwardly from the top exterior surface; and a substantially opaque portion at least partially covering each of the side exterior surfaces of the phosphorescent key body, covering less than all of at least one of the side exterior surfaces of the phosphorescent key body, and having at least one inner boundary surface on the top surface that defines an open region in the shape of a predetermined character.

26. A key as claimed in claim 25, wherein the substantially opaque portion covers the entire top surface of the phosphorescent key body except for the open region defining the predetermined character.

27. A key as claimed in claim 25, wherein the substantially opaque portion covers less than all of each of the side surfaces of the phosphorescent key body.

28. A key as claimed in claim 25, wherein the phosphorescent key body defines a bottom exterior surface extending inwardly from the side exterior surfaces.

29. A computer, comprising:

a housing including a housing keyboard portion and a housing display portion pivotally connected to the housing keyboard portion and movable between open and closed positions;

a processor within the housing;

a keyboard, carried by the housing keyboard portion and operably connected to the processor, including a plurality of keys, each of the keys defining an overall key volume and including a volume of phosphorescent key body material, which defines a surface, and a volume of substantially opaque material, associated with the surface of the phosphorescent key body material, having at least one inner boundary surface that defines an open region in the shape of a predetermined character, the volume of the substantially opaque material being substantially less than the volume of the phosphorescent key body material; and a display carried by the housing display portion and operably connected to the processor.

30. A computer as claimed in claim 29, wherein the phosphorescent key body material of each key defines a top surface and a plurality of side surfaces and the substantially opaque portion covers the entire top surface of the phosphorescent key body material except for the open region defining the predetermined character end at least partially covers each of the side surfaces.

31. A device as claimed in claim 29, further comprising:

an actuatable device located under the at least one of the keys;

wherein the phosphorescent key body material includes structure configured to engage the actuatable device.

32. A device, comprising:

a housing; and a user interface, associated with the housing, including a plurality of keys, at least one of the keys including a key body having a phosphorescent surface and a layer of substantially opaque material, having at least one inner boundary surface that defines an open region in the shape of a predetermined character with no material located therein, covering the phosphorescent surface such that a portion of the phosphorescent surface in the shape of the predetermined character is visible through the open region, wherein the phosphorescent surface defines a top surface of the key body, the top surface defines peripheral edges, and the layer of substantially opaque material defines an outer periphery that extends at least to the peripheral edges of the top surface.

33. A device as claimed in claim 32, further comprising:

a display associated with the housing.

34. A device as claimed in claim 33, wherein the housing includes a user interface portion that supports the user interface and a display portion that supports the display.

35. A device as claimed in claim 34, wherein the user interface portion is pivotably secured to the display portion.

36. A device, comprising:

a housing; and a user interface, associated with the housing, including a plurality of keys, at least one of the keys including a key body, having a phosphorescent top exterior surface and phosphorescent side exterior surfaces extending downwardly from the phosphorescent top exterior surface, and a layer of substantially opaque material covering at least a portion of each of the phosphorescent side exterior surfaces, covering less than all of at least one of the phosphorescent side exterior surfaces, and a portion of the phosphorescent top exterior surface and having at least one inner boundary surface that defines an open region in the shape of a predetermined character covering the phosphorescent top exterior surface such that a portion of the phosphorescent surface in the shape of the predetermined character is visible through the open region.

37. A device as claimed in claim 36, wherein the key body defines a phosphorescent bottom exterior surface extending inwardly from the phosphorescent side exterior surfaces.

38. A user interface, comprising:

a plurality of keys;

at least one of the keys including a key body having a phosphorescent surface and a layer of substantially opaque material, having at least one inner boundary surface that defines an open region in the shape of a predetermined character with no material located therein, covering the phosphorescent surface such that a portion of the phosphorescent surface in the shape of the predetermined character is visible through the open region, wherein the phosphorescent surface defines a top surface of the key body, the top surface defines peripheral edges, and the layer of substantially opaque material defines an outer periphery that extends at least to the peripheral edges of the top surface.

39. A user interface, comprising:

a plurality of keys;

at least one of the keys including a key body, having a phosphorescent top exterior surface end phosphorescent side exterior surfaces extending downwardly from the phosphorescent top exterior surface, and a layer of substantially opaque material covering at least a portion of each of the phosphorescent side exterior surfaces, covering less than all of at least one of the phosphorescent side exterior surfaces, and a portion of the phosphorescent top exterior surface and having at least one inner boundary surface that defines an open region in the shape of a predetermined character covering the phosphorescent top exterior surface such that a portion of the phosphorescent surface in the shape of the predetermined character is visible through the open region.

40. A user interface as claimed in claim 39, wherein key body defines a phosphorescent bottom exterior surface extending inwardly from the phosphorescent side exterior surfaces.

41. A key, comprising:

a key body having a phosphorescent surface; and a layer of substantially opaque material, having at least one inner boundary surface that defines an open region in the shape of a predetermined character with no material located therein, covering the phosphorescent surface such that a portion of the phosphorescent surface in the shape of the predetermined character is visible through the open region, wherein the phosphorescent surface defines a top surface of the key body, the top surface defines peripheral edges, and the layer of substantially opaque material defines an outer periphery that extends at least to the peripheral edges of the top surface.

42. A key, comprising:

a key body, having a phosphorescent top exterior surface and phosphorescent side exterior surfaces extending downwardly from the phosphorescent top exterior surface; and a layer of substantially opaque material covering at least a portion of each of the phosphorescent side exterior surfaces and a portion of the phosphorescent top exterior surface, covering less than all of at least one of the phosphorescent side exterior surfaces, and having at least one inner boundary surface that defines an open region in the shape of a predetermined character covering the phosphorescent surface such that a portion of the phosphorescent top exterior surface in the shape of the predetermined character is visible through the open region.

43. A key as claimed in claim 42, wherein the key body defines a phosphorescent bottom exterior surface extending inwardly from the phosphorescent side exterior surfaces.

44. A computer, comprising:

a housing including a housing keyboard portion and a housing display portion pivotably connected to the housing keyboard portion and movable between open and closed positions;

a processor within the housing;

a keyboard, carried by the housing keyboard portion and operably connected to the processor, including a plurality of keys, each of the keys including a key body having a phosphorescent surface and a layer of substantially opaque material, having at least one inner boundary surface that defines an open region in the shape of a predetermined character with no material located therein, covering the phosphorescent surface such that a portion of the phosphorescent surface in the shape of the predetermined character is visible through the open region, wherein the phosphorescent surface comprises a top surface and a plurality of side surfaces and the layer of substantially opaque material covers the entire top surface except for the open region and at least partially covers each of the side surfaces; and a display carried by the housing display portion and operably connected to the processor.

45. A method of making a key for a user interface, the key defining an overall key volume, the method comprising the steps of:

providing a phosphorescent key body that includes a surface and occupies a substantial portion of the overall key volume; and providing a substantially opaque portion over the surface of the phosphorescent key body having at least one boundary surface that defines an open region in the shape of a predetermined character by forming a layer of opaque material on the surface of the phosphorescent key body and removing a portion of the substantially opaque material in the shape of the predetermined character.

46. A method as claimed in claim 45, wherein the step of providing a phosphorescent key body comprises molding a phosphorescent key body.

47. A method as claimed in claim 45, wherein the step of removing a portion of the substantially opaque material comprises removing a portion of the substantially opaque material with a laser etching process.

48. A method of making a key for a user interface, the key defining an overall key volume, the method comprising the steps of:

providing a phosphorescent key body that includes a surface and occupies a substantial portion of the overall key volume;

forming a substantially opaque portion having at least one boundary surface that defines an open region in the shape of a predetermined character on a sheet of at least substantially transparent material; and providing the substantially opaque portion over the surface of the phosphorescent key body.

49. A method as claimed in claim 48, wherein the step of providing the substantially opaque portion placing the sheet in a mold for the phosphorescent key body.

50. A key for use with a user interface, comprising:

a phosphorescent key body defining a surface; and a substantially opaque portion, associated with the surface of the phosphorescent key body, having a first boundary surface that defines a first open region in the shape of a predetermined character through which the phosphorescent key body is visible and a second boundary surface at least in part defining a second open region having a closed shape that extends around the first open region and through which the phosphorescent key body is visible.

51. A key as claimed in claim 50, wherein the first boundary surface of the substantially opaque portion comprises a plurality of boundary surfaces.

52. A key as claimed in claim 50, wherein the phosphorescent key body defines a top surface and a plurality of side surfaces extending downwardly from the top surface, the substantially opaque portion covers the entire top surface of the phosphorescent key body, except for the first open region, and covers each of the side surfaces, except far the second open region.

53. A key as claimed in claim 50, wherein the substantially opaque portion is covered by a layer of at least substantially transparent material.

* * * * *

UNITED STATES PATENT AND TRADEMARK OFFICE

CERTIFICATE OF CORRECTION

PATENT NO. : 7,073,916 B2
APPLICATION NO. : 10/134874
DATED : July 11, 2006
INVENTOR(S) : Memphis Zhihong Yin et al.

It is certified that error appears in the above-identified patent and that said Letters Patent is hereby corrected as shown below:

In column 8, line 40, in Claim 10, delete "claim 8," and insert -- claim 9, --, therefor.

In column 9, line 32, in Claim 21, delete "inwardy" and insert -- inwardly --, therefor.

In column 10, line 6, in Claim 29, delete "pivotatly" and insert -- pivotably --, therefor.

In column 10, line 29, in Claim 30, delete "end" and insert -- and --, therefor.

In column 11, line 31, in Claim 39, delete "end" and insert -- and --, therefor.

In column 14, line 12, in Claim 52, delete "far" and insert -- for --, therefor.

Signed and Sealed this

Third Day of March, 2009

JOHN DOLL
*Acting Director of the United States Patent and Trademark Office*